Figure 1:
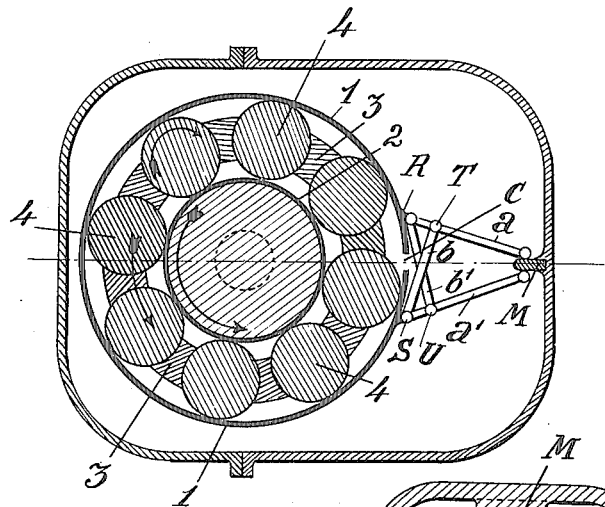

R. Matteucci,
Inventor.
By G. Croydon Marks
Attorney.

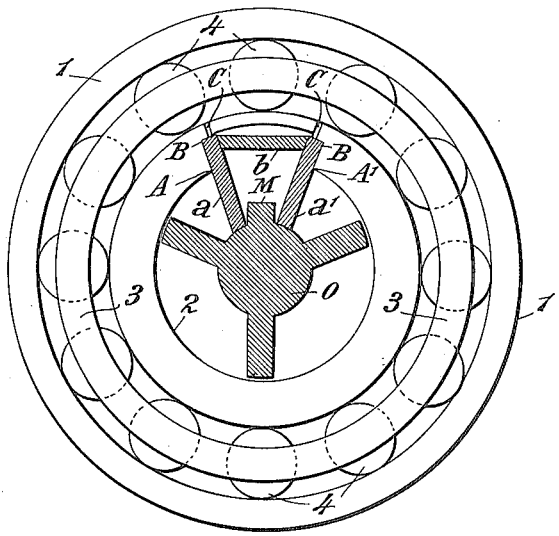
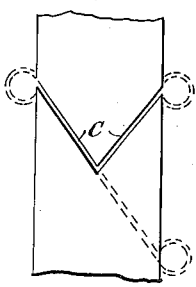
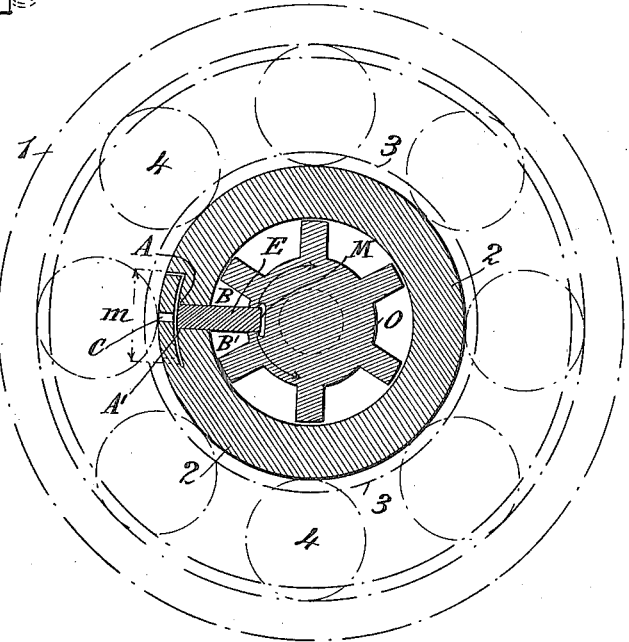

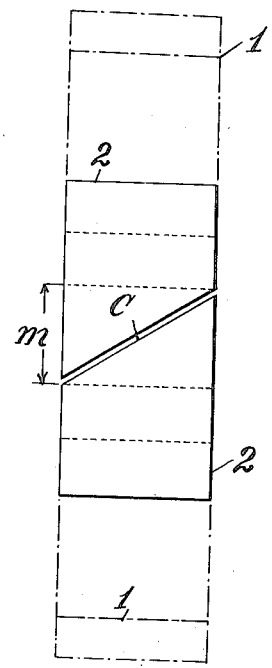
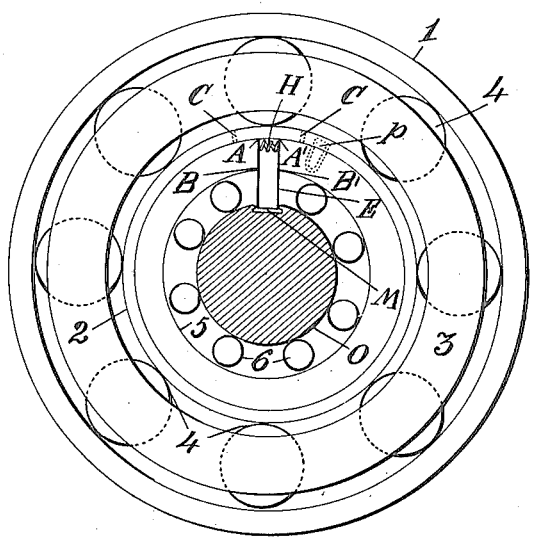
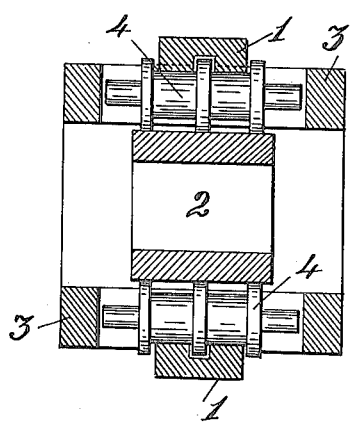

UNITED STATES PATENT OFFICE.

RAFFAELE MATTEUCCI, OF TURIN, ITALY.

GEARING.

1,190,662. Specification of Letters Patent. Patented July 11, 1916.

Application filed December 5, 1913. Serial No. 804,875.

*To all whom it may concern:*

Be it known that I, RAFFAELE MATTEUCCI, a subject of the King of Italy, residing at Turin, Italy, (whose post-office address is 43 Via Arsenale, Turin, Italy,) have invented a new and useful Improvement in Gearing, of which the following is a specification.

This invention relates to power transmitting mechanisms of the frictional type comprising a cage supporting a plurality of planetary cylindrical rollers which rotate by friction between an inner and an outer ring having plain rolling tracks. It is known in such mechanisms to split the outer ring and to provide a lever fulcrumed thereto adjacent one side of the split and connected to the ring at the opposite side of the split by a link, such lever mechanism being actuated by the driving member to contract the ring more or less so as to automatically increase and decrease the pressure on the planetary set in accordance with the variation in power transmitted through the mechanism, but such lever mechanism has been adapted to perform this function only in respect of one direction of rotation of the power transmission device.

The friction gear in accordance with the present invention consists essentially in the provision of a fulcrum at or near each end of the split ring, that is to say, at each side of the split, and a lever mechanism actuated by the driving member, when rotated in either direction (forward or reverse drive), to operate upon the fulcrum to constrain the ring into frictional engagement with the planetary rollers with variable pressure according to the variation in the power transmitted.

In my improved power transmission device either the outer or the inner ring may be split. In the former case the pressure regulating device is adapted to contract the ring more or less and consists of a duplex set of levers and links outside of the ring, the levers being hinged to fulcrums at the ends of the ring and engaging an abutment at their outer ends and each of the links being pivotally connected to an end of the ring and to the opposite lever. In the latter case, that is to say when the inner ring is split, the pressure regulating device is adapted to more or less expand the ring, and consists of one or two levers arranged inside said ring and having the outer end or ends, as the case may be, engaging in the split in the ring the ends of which latter form the fulcrums, said lever or levers being in engagement at the inner end or ends with a recess or an abutment on a central shaft. When the split ring is arranged interiorly of the planetary rollers I prefer to provide ball bearings between said ring and the driving member to prevent sliding friction. When the split ring is arranged exteriorly the pivoted parts of the levers may be provided with ball bearings.

This invention is illustrated by way of examples in the accompanying drawings, wherein:—

Figure 2:
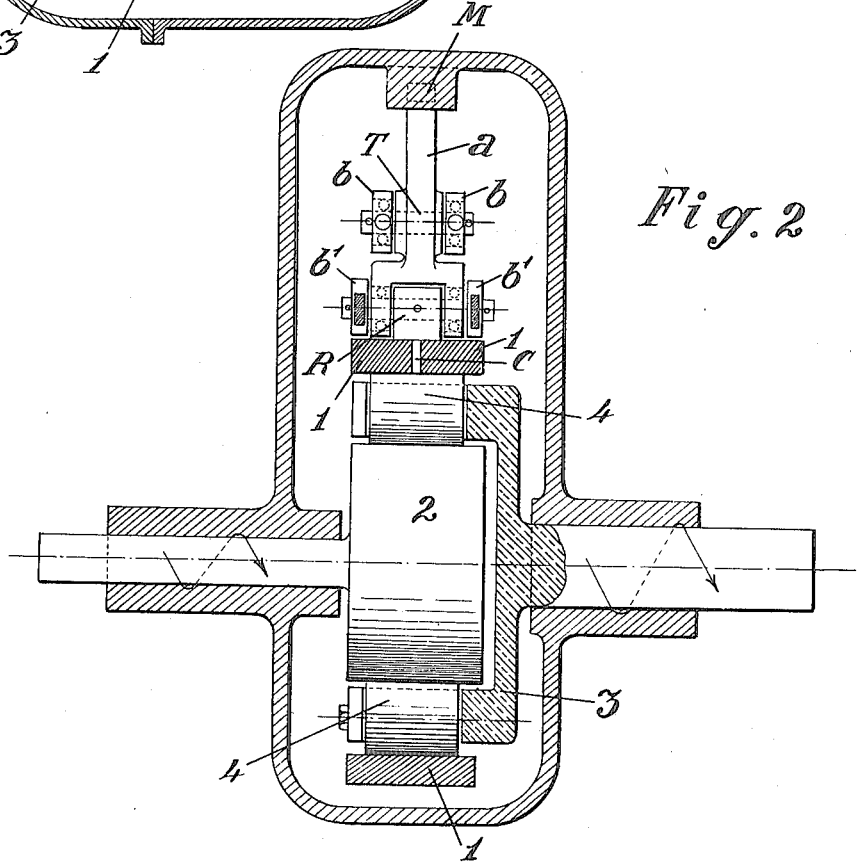

Figure 1 is a cross section of a planetary mechanism arranged in accordance with this invention. Fig. 2 is a plan view of the same. Fig. 3 is a detail view of the split ring. Fig. 4 is a cross section of a second modified form of the invention. Fig. 5 is a cross sectional view of a third modification, and Fig. 6 is a schematical side view of the same. Fig. 7 is a cross section of a fourth modified form of the invention. Fig. 8 illustrates in cross sectional side view a constructional form of the planetary mechanism to which the invention may be applied.

The planetary mechanism illustrated in Fig. 1 is composed of a cage 3, supporting a plurality of planetary rollers 4, which are rotated by their frictional contact with the inner surface of the outer cylindrical ring 1, and with the outer surface of the inner cylindrical ring or roller 2. In this form of construction, as in the other forms hereinafter described, the planetary mechanism comprises a driven and a driving member and a fixed one. The outer ring, inner ring and cage can be alternatively used as desired to form said members.

In the construction form shown in Fig. 1, the pressure regulating device consists of two levers —a— —a'—, and two tie-rods or links —b— —b'—, applied on the outer annular member 1, forming the external endless track for the rollers. The inner ends of the levers —a— and —a'—, and the tie-rods —b— and —b'— are jointed with the two ends of the ring 1 at R and S so that the cut C is situated between the joints. The outer ends of the levers are in engagement with an abutment M. The ends of the tie-rods —b— and —b'— are respectively pivotally connected with suitable points T and U of the levers —a— and —a'—, while the other ends of these rods are connected with the pivots R and S. The arrangement of the said abutment M may be carried out in a variety of ways according to the working conditions of the ring 1, without departing from the essence of the present invention. When the ring —1— constitutes the fixed member of the mechanism (see Figs. 1 and 2) the abutment M is supported by a stationary member, for instance by the base plate or by the casing inclosing the mechanism as shown. If the ring —1— constitutes the driven or the driving member of the mechanism the abutment M is supported by a rotatable member, such as a collar, a sleeve, a crank or the like running about the same axis of the ring —1— and connected respectively with the driven shaft or with the driving shaft. In any case the abutment M may be arranged in the shape of a projection, or a tooth, or of a recess, or in any other constructional form which permits of forming proper surfaces upon which the outer ends of the levers —a— and —a'— are engaged. The said annular member 1 is cut slantwise or in V-shape or the like (see Fig. 3) in such manner that it can be more or less contracted without causing any breaks in the rolling movement of the satellite rollers. According to the direction of the movement, the lever —a— and the rod —b— (or the lever —a'— and the rod —b'—) exert a stress upon the outer ring so that the radius of this ring decreases and the pressure upon the rollers will be increased. When the effort transmitted by the mechanism increases, (which increase may be dependent upon the increase of the load) the ring is contracted and the pressure upon the rollers is also increased. The intensity of this pressure is therefore in a determined ratio with the effort transmitted by the mechanism and with the length of the arms of lever of —a—, —a'—. The pressure exerted upon the rollers follows thereby at every instant the fluctuations of the effort transmitted, which prevents any sliding motion of the rollers over the annular members.

Fig. 4 illustrates another form of the invention provided with a pressure-regulating device analogous to that shown in Figs. 1, 2, in which however, the two levers —a— —a'—, instead of being applied on the outer ring 1, exert their action on the inner ring 2. Within a suitable recess in the interior of the inner ring 2 corresponding to the cut C, the two levers —a— and —a'— are placed, having their fulcra respectively at A and A' and being connected by a single or common rod —b— which keeps them pressed to faces A B and A' B' of the said recess and both of them bearing on tooth M located on the supporting member O, which can rotate about its axis. According to its direction of rotation tooth M presses the lever —a— or —a'— which by the common rod —b— puts ring 2 under tension and the rollers 4 under pressure in proportion to the effort transmitted through the planetary gearing. The mechanism, as is shown is designed to transmit the movement in both directions.

Figs. 5 and 6 show the same as Fig. 4, but with the difference that the pressure-regulating device comprises a single lever E which replaces the levers —a— and —a'— and the rod —b—. One end of this lever E is inserted into the recess A B, A' B' in the ring 2, while the other end of this lever is mounted in a notch M located in the support O. According to the direction of movement the lever E bears against A—B' or A' B so that the ring 2 is put under tension and causes a pressure upon the rollers as before.

Fig. 7 shows a modification of the form of construction illustrated in Fig. 5 with the difference that the inner ring of the planetary mechanism is composed of two concentric rings 2 and 5. The ring 2 is cut at C slanting or in V-shape or the like, and its outer surface is in contact with the rollers 4. On the inner surface of this ring 2 is fixed, through suitable devices such as studs —p—, keys, driving bolts or the like, a ring 5 which is provided with a chamber A—B, A'—B' situated correspondingly to the cut C. In the said chamber is located one end of the lever E, the other end of which is inserted into the notch M of the supporting member O. A spring H is mounted between the faces A B A' B' of said chamber or in any other suitable recess. The said spring H tends to expand the ring 5 so as to increase the pressure of ring 5 against ring 2 for preventing the pressure exerted upon the rollers from diminishing below a certain minimum. 6 are balls or rollers which are employed for centering the rings 2 and 5 on the supporting member O and for avoiding the development of a sliding friction between the said supporting member O and the ring 5 in consequence of their small displacements which take place under the action of oscillating movements of the lever E when the planetary gearing runs under load. An intermediate ring as the ring 2 in Fig. 7 may be employed in combination with all the structural forms of the invention. This ring will be inserted between the ring of the pressure regulating mechanism and the planetary rollers. It will be cut slantwise, or in V shape or the like. This ring which does not prevent the action of the pressure regulating mechanism, allows however the employment of special metals capable of withstanding the rolling wear and tear due to the rotation of the rollers.

In the hereinbefore described constructional examples the cylindrical rollers of the gearing have only one diameter but they may have two or more diameters.

In the constructional form shown in Fig. 8 the rollers 4 have portions of two different diameters such portions being respectively in contact with the annular members 1 and 2, whereby a greater difference between the speeds of the driving shaft and the driven shaft is produced.

What I claim and desire to secure by Letters Patent is:

1. A power-transmitting mechanism comprising a rotary driving member, a rotary driven member and a non-rotary member, one of said members consisting of a cage supporting a plurality of cylindrical rollers and the others of an inner and an outer ring having tracks adapted to be frictionally engaged by said rollers and one of said rings being split, and means for automatically actuating said split ring, for either direction or rotation of the driving member, to press against the rollers with a variable force depending on the power transmitted.

2. A power-transmitting mechanism comprising a rotary driving member, a rotary driven member and a non-rotary member, one of said members consisting of a cage supporting a plurality of cylindrical rollers and the others of an inner and an outer ring having tracks adapted to be frictionally engaged by said rollers and one of said rings being split, a fulcrum at each end of the split ring, and a lever mechanism operating on said fulcra and actuated by the driving member, when rotating in either direction, to force the split ring into engagement with the rollers with a variable pressure depending on the variations in the power transmitted.

3. A power transmitting mechanism comprising a rotary driving member, a rotary driven member and a non-rotary member, one of said members consisting of a cage supporting a plurality of cylindrical rollers and the others of an inner and outer ring having tracks adapted to be frictionally engaged by said rollers, and the inner of said rings being split, and a lever engaging at its outer end between the ends of the split ring and at its inner end with a central shaft.

4. A power transmitting mechanism comprising a rotary driving member, a rotary driven member and a non-rotary member, one of said members consisting of a cage supporting a plurality of cylindrical rollers and the others of an inner and outer ring having tracks adapted to be frictionally engaged by said rollers, and the inner of said rings being split, a second split ring arranged inside the aforesaid split ring, and connected thereto so as to form virtually one member, and a lever engaging at its outer end between the ends of the second split ring and at its inner end with a central shaft.

5. A power transmitting mechanism comprising a rotary driving member, a rotary driven member and a non-rotary member, one of said members consisting of a cage supporting a plurality of cylindrical rollers and the others of an inner and an outer ring having tracks adapted to be frictionally engaged by said rollers, and the inner of said rings being split, a lever engaging at its outer end between the ends of the split ring and at its inner end with a central shaft, and antifriction means arranged between the split ring and the central shaft.

In testimony whereof I have signed my name to this specification in the presence of two subscribing witnesses.

RAFFAELE MATTEUCCI.

Witnesses:
C. L. FEYLES,
ISABELLA CANE.